United States Patent Office 2,697,457
Patented Dec. 21, 1954

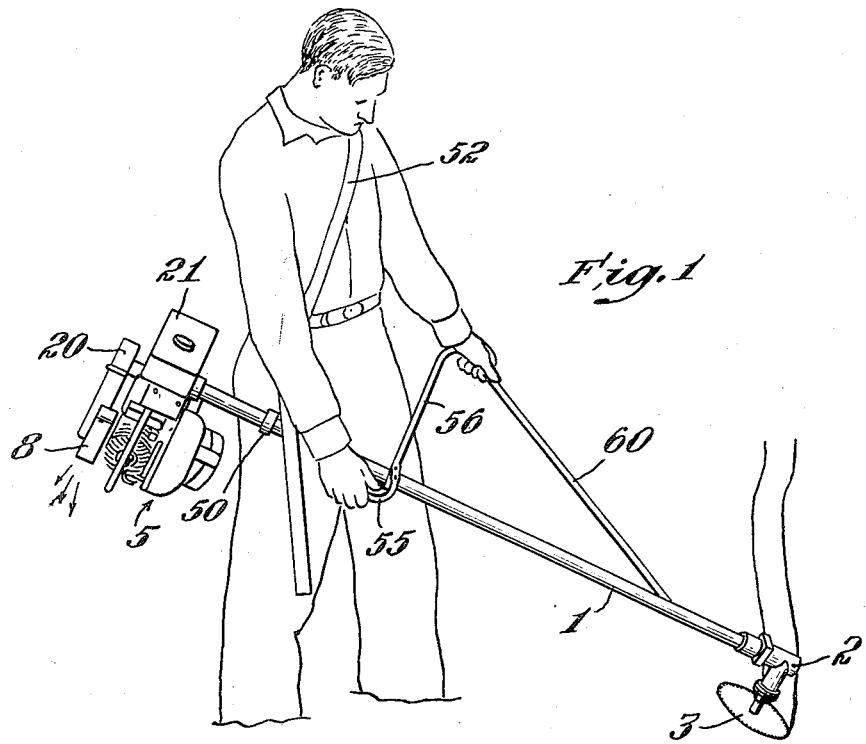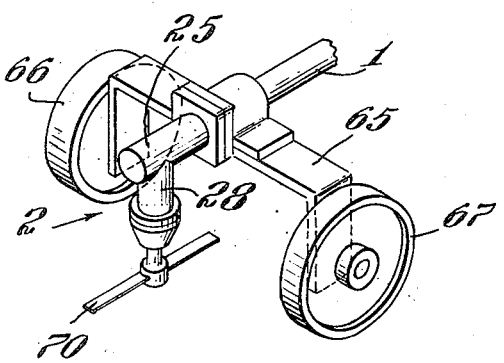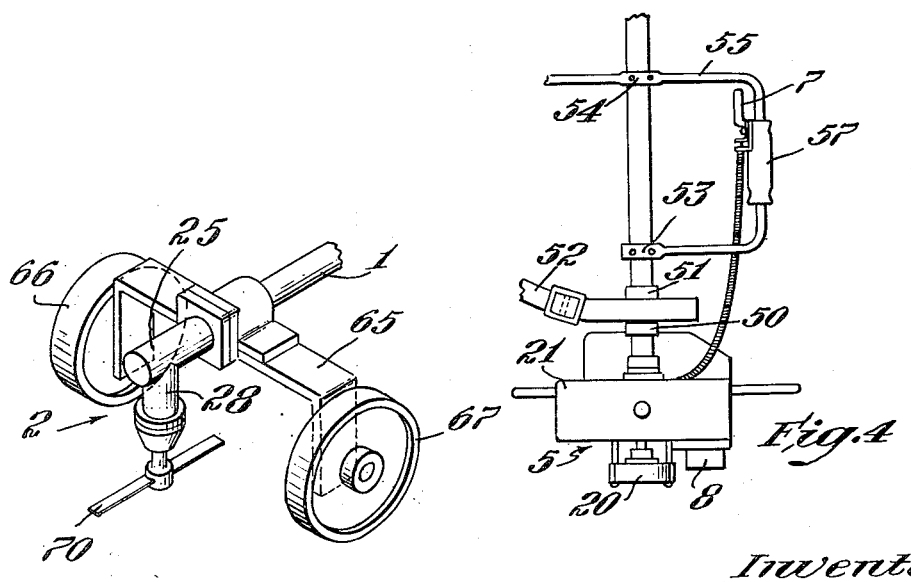

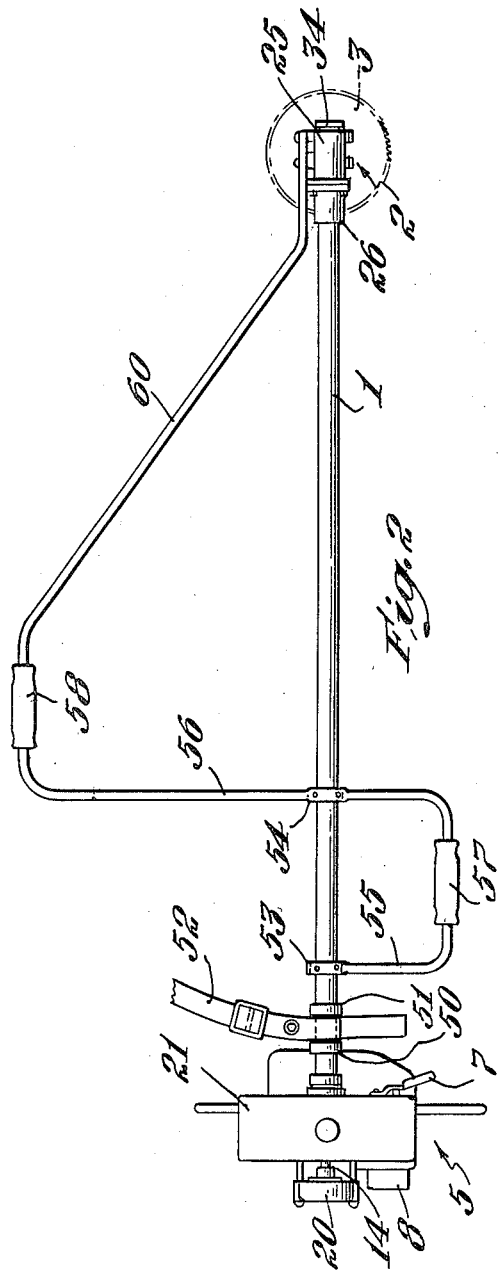
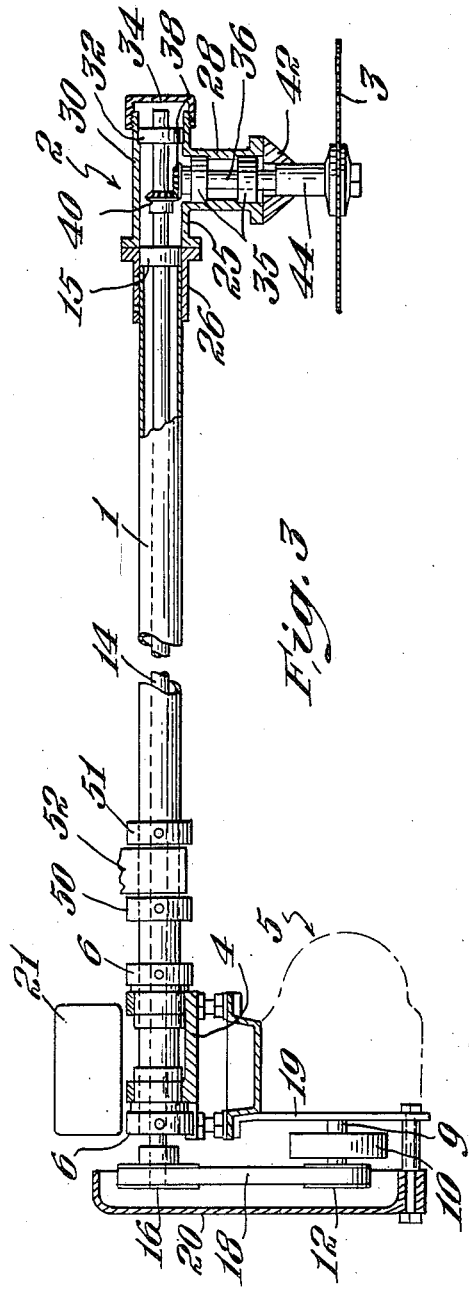

2,697,457

MANUALLY PORTABLE BRUSH CUTTING POWER TOOL

Benjamin F. Lawrence, Greenfield, Mass., assignor to Brushmaster Saw, Inc., Keene, N. H., a corporation of New Hampshire Application July 23, 1952, Serial No. 300,541

4 Claims. (Cl. 143—43)

This invention relates to a portable power tool and, as illustrative of its utility, is herein shown as a machine particularly suitable for cutting brush and performing a number of other tasks requiring the use of a power driven rotary implement.

The design and construction of machines of this type presents several troublesome problems, such as weight, durability, balance, ease of manipulation and safety in operation. For example, it has been proposed to provide a power tool wherein the motor is strapped to the back or other part of the operator's body with the drive shaft arranged so that it can be manipulated by the operator, and although such a design provides a usable device, its use, as a practical matter, is limited to open or accessible places where the operator may stand erect.

The principal object of the present invention is to provide a portable power tool which not only overcomes the aforementioned difficulties, but which is of relatively light weight and yet of strong and durable construction, which is at all times supported by the operator so as to maintain the desired balance and thus insure ease of operation, and which may be used without danger of injury to the operator.

Further objects relate to various features of construction and will be apparent from a consideration of the following description and accompanying drawings, wherein:

Fig. 1 is a view of a power tool constructed in accordance with the present invention and showing the manner in which it is normally used;

Fig. 2 is a top plan view of the power tool shown in Fig. 1;

Fig. 3 is an enlarged axial section with parts broken away so as to illustrate certain details of construction;

Fig. 4 is a view showing an alternative manner of mounting the engine throttle; and Fig. 5 is a view illustrating the manner in which the free end of the machine may be supported when operating at a fixed level, as hereinafter more fully described.

In accordance with the present invention my power tool comprises an elongate tubular member or housing, one end of which carries one or more holding means for an operating instrumentality such as a saw or other form of cutting implement, a grinder or buffer, or any other form of rotary tool, and the opposite end of the tubular member is swivelly connected to a frame member carrying a suitable source of power such as an electric motor or an internal combustion engine. Extending within the tubular member and between the motor and holding means is a chain or belt, a flexible or rigid shaft, or an hydraulic transmission or other suitable power transmission mechanism. Where the tool is designed for high speed operation the transmission mechanism may be connected to the motor by a contrifugal clutch which automatically "cuts out" when the engine speed drops to a predetermined number of revolutions, thereby disengaging the power transmission mechanism when the engine is idling; but where a high torque and a slow speed is desired a variable speed transmission mechanism, such as an hydraulic speed control device, may be used along with or in place of the centrifugal clutch.

In any case the construction and arrangement of parts are such that the center of gravity of the machine is at a point on the tubular member preferably adjacent to its swivel connection with the motor so that the major portion of the tubular member projects a substantial distance beyond the center of gravity. The machine is supported at or adjacent to its center of gravity by any suitable means such as a hook, strap or the like permitting the machine to be suspended from the body of the operator or otherwise suitably supported, and between such support and the free or operating end of the tubular member is a handle by means of which the tool is manipulated. Where the machine is designed to cut brush and the like, the handle may be provided with an extension terminating adjacent to the free end of the tubular member and arranged so as to deflect the cuttings away from the operator.

In operation the tool is at all times balanced so that it can be easily manipulated by one hand of the operator and a further feature is what appears to be a gyroscopic stabilizing action of the motor which overcomes the tendency of the operating instrumentality to "k.ck" or "jump" when it encounters an object difficult to cut, such as a heavy stump or the like. Since the tubular member projects a substantial distance from the operator's body there is no danger of accidental injury.

Referring to the accompanying drawings which show what is now considered a preferred embodiment of the invention, the machine shown therein comprises an elongate tubular member 1, the free or outer end of which is connected to a holder 2 for a cutting instrumentality such as a saw 3. The opposite end of the housing extends through aligned openings in the frame 4 which carries an internal combustion engine 5 and is held in position by spaced collars 6 so as to provide a swivel connection shown more clearly in Fig. 3. The throttle 7 of the engine may be conveniently mounted either on the frame 4 adjacent to the inner collar 6, as shown in Fig. 2, or on the handle 57, as shown in Fig. 4, and its exhaust 8 is directed downwardly as shown in Fig. 1.

The engine 5 may be of conventional design having an operating speed of 4,000 to 5,000 R. P. M. and approximately three horsepower out-put, and its drive shaft 9 is connected to a centrifugal clutch 10 which carries a sheave 12. The power transmitting means is here shown as a rigid shaft 14 which extends within the tubular member 1 and projects outwardly above and in parallel alignment with the drive shaft 9, the end portions of the shaft 14 being supported by anti-friction bearings 15 fitting within the tubular member 1. The projecting end of the shaft 14 carries a sheave 16 which is driven through a V-belt 18 by the sheave 12. A protective shield or guard 20, enveloping the moving parts 12, 16 and 18, is bolted or otherwise secured to a depending bracket 19 attached to the frame 4. With this construction and arrangement the engine 5 is swivelly supported by the end of the tubular member 1 so that it hangs in an upright position regardless of the extent of which the tubular member 1 is rotated and hence the tank 21 is at all times in a position to feed fuel to the engine.

The opposite or outer end of the shaft 14 projects beyond the end of the tubular member 1 into the housing 25 of the holder 2. The housing 25 is rigidly secured to a fitting 26 carried by the tubular member 1 and is in the form of a T having a depending branch 28 and a straight run 30, the latter carrying an anti-friction bearing 32 through which the end of the shaft 14 extends a distance sufficient to provide a power take off. The end of the straight run 30 is provided with a removable screw cap to close this end when not in use.

Within the branch 28 is a pair of spaced anti-friction bearings 35 which support a shaft 36 the outer end of which projects beyond the end of the branch 28 to provide a second power take off. The inner end of the shaft 36 carries a miter gear 38 meshing with a second miter gear 40 carried by the shaft 14. In order to prevent foreign matter of working into the housing 25 the outer end of the branch 28 is provided with a conical skirt 42 closely embracing the connector or adaptor 44 carried by the free end of the shaft 36. The saw 3 or other cutting instrumentality is carried by the adaptor 44 in the usual manner.

The construction and arrangement of parts thus far described are such that the center of gravity of the machine is at a point on the tubular member inwardly of but adjacent to the inner collar 6 and at approximately this location is a pair of spaced collars 50 and 51. The supporting means, here shown as a strap or sling 52 is looped about the tubular member between the collars 50 and 51, it being understood that the collars and sling may be adjusted on the tubular member so as to secure the desired balance when the machine is in use, as illustrated in Fig. 1.

Between the holder 2 and the collars 50 and 51 are operating handles by means of which the machine may be manually manipulated and these handles consist of a single length of tubing secured to the tubular member 1 by clamps 53 and 54 or other suitable means and bent to form a U-shaped part 55 on one side of the tubular member and an inverted L-shaped part 56 on the opposite side of the tubular member, hand grips 57 and 58 being provided on the parts 55 and 56, respectively. The part or handle 56 is provided with an extension 60 the end of which is secured to the housing 25, as shown in Fig. 2, thereby providing a deflector for brush or other cuttings thrown back by the saw.

It will be observed that the handle 56 projects laterally on one side a distance greater than that of the handle 55 on the other side and because of this arrangement the position of the operator is on the side of the handle 56, as shown in Fig. 1, and when thus positioned the throttle 7 may be quickly manipulated by the right hand of the operator to control the engine speed during the cutting operation.

When used to cut brush, saplings or to trim branches, the machine is supported by the sling 52 over the operator's shoulder as illustrated in Fig. 1, thus leaving both hands free to maneuver the saw. Since the sling supports the machine at or adjacent to its center of gravity, it is at all times properly balanced and by rotating the tubular member the operator may cut either horizontally or vertically. The position of the throttle 7 close to the handle 55 and at the level of the operator's hip permits quick control of the engine speed and thus obviates withdrawing the saw from the work when difficult cutting is encountered. In event the saw encounters an obstacle which reduces the normal operating speed to the point of inefficient operation (e. g., 1400 R. P. M.) the centrifugal clutch automatically disengages the engine from the transmission shaft 14; and likewise when the engine is idling, it is disengaged from the shaft 14, thus arresting rotation of the saw when not in use. Since the saw or other cutting implement is at all times out of reach of the operator, there is no danger of inflicting injury on himself.

If desired the cap 34 may be removed and the adaptor 44 applied to the projecting end of the shaft 14, in which case a drill or other rotary cutting implement may be connected thereto and the machine operated as above described.

Where it is desired to cut grass, grind or otherwise operate at a given level, the end of the machine may be supported on a removable carriage, as shown in Fig. 4. Such a carriage may comprise an inverted U-shaped frame 65 clamped or otherwise suitably secured to the end of the tubular member 1 so that the tool holder 2 projects forwardly with the branch 28 extending downwardly. Wheels 66 and 67 are mounted on stub shafts secured to the lower ends of the depending legs of the frame 65. As here shown for the purpose of illustration, a propeller type grass cutter 70 is carried by an adaptor 71 which is secured to the power take-off shaft 36, although it is to be understood that if desired, such implements as a grinding or buffing wheel or the like may be substituted for the grass cutter herein shown.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. A portable power tool of the class described, comprising an elongate tubular member, holding means at one end of said tubular member for receiving an operating instrumentality, a power transmission shaft connected with said holding means and extending through said tubular member with its opposite end projecting beyond the opposite end of said tubular member, a frame member swivelly connected to said opposite end of said tubular member, an internal combustion engine carried by said frame member so that it hangs in an operative position when said tubular member is rotated and tilted, a centrifugal clutch having a connection with the output shaft of said engine and said projecting end of said power transmission shaft, a tool-supporting coupling carried by said tubular member at a point adjacent to the center of gravity of said tool, and a handle between said tool-supporting coupling and said holding means for manipulating said tool.

2. A power tool as set forth in claim 1, wherein said handle is integrally connected with one end of a generally arcuate extension, the opposite end of which is secured to said one end of said tubular member so as to provide a deflector.

3. A power tool as set forth in claim 1, wherein said tool-supporting coupling is adjustable lengthwise of said tubular member and a flexible sling adapted to fit about the body of the operator is connected to said tool-supporting coupling.

4. A portable power tool of the class described, comprising an elongate tubular member, holding means at one end of said tubular member for receiving an operating instrumentality, a power transmission shaft connected with said holding means and extending through said tubular member with its opposite end projecting beyond the opposite end of said tubular member, a frame member swivelly connected to said opposite end of said tubular member, an internal combustion engine suspended from said frame member so that it hangs in an operative position when said tubular member is rotated and tilted, a centrifugal clutch connected to said engine with its output shaft extending outwardly below the projecting end of said power transmission shaft, transmission mechanism connecting said output shaft and said projecting end of said power transmission shaft, a tool-supporting coupling carried by said tubular member at a point adjacent to the center of gravity of said tool, and a handle between said tool-supporting coupling and said holding means for manipulating said tool.

References Cited in the file of this patent

UNITED STATES PATENTS

| Number | Name | Date |
| --- | --- | --- |
| 1,116,995 | Casteran | Nov. 10, 1914 |
| 1,124,552 | Suggs | Jan. 12, 1915 |
| 1,533,974 | Davis | Apr. 14, 1925 |
| 2,490,255 | Chase | Dec. 6, 1949 |
| 2,504,880 | Rittenhouse | Apr. 18, 1950 |

FOREIGN PATENTS

| Number | Country | Date |
| --- | --- | --- |
| 582,131 | Germany | Aug. 9, 1933 |